United States Patent

Rattenbury

[15] 3,666,837
[45] May 30, 1972

[54] POLYMERCAPTO POLYPHOSPHITES

[72] Inventor: Kenneth H. Rattenbury, Morgantown, W. Va.

[73] Assignee: Weston Chemical Corporation, New York, N.Y.

[22] Filed: June 24, 1969

[21] Appl. No.: 836,150

[52] U.S. Cl. .............................. 260/928, 71/71, 99/150 R, 252/46.6, 252/400, 260/45.7 PS, 260/45.95, 260/294, 260/8 G, 260/329 S, 260/609 D, 260/814, 260/929, 260/930, 260/30.6, 260/976
[51] Int. Cl. ...................... C07f 9/16, B01j 1/16, C08f 45/58
[58] Field of Search .................................. 260/928, 930, 929

[56] References Cited

UNITED STATES PATENTS 2,871,202    1/1959    Scott..................................260/928 X Primary Examiner—Joseph Rebold
Assistant Examiner—Anton H. Sutto
Attorney—Cushman, Darby & Cushman

[57] ABSTRACT

Compounds are prepared having the formula

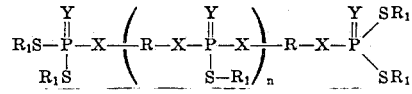

where $n$ is 0 or an integer, preferably not over 9, R is a divalent aromatic, aliphatic or cycloaliphatic group, $R_1$ is alkyl, haloalkyl, aryl, haloaryl, alkenyl, aralkyl, haloalkenyl, cycloalkyl, X is S, Y is nothing or oxygen.
The thiophosphites are useful as antioxidants and as defoliants. The thiophosphates are useful as plasticizers and defoliants.

17 Claims, No Drawings

POLYMERCAPTO POLYPHOSPHITES

The present invention relates to novel thiophosphites and thiophosphates.

The compounds have the general formula

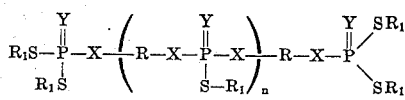

where $n$ is zero or an integer, preferably not over 9, R is a divalent aromatic, aliphatic or cycloaliphatic group, $R_1$ is alkyl, haloalkyl, aryl, haloaryl, alkenyl, haloalkenyl, cycloalkyl or aralkyl, X is S, and Y is nothing or oxygen. Preferably Y is nothing. The $R_1$ groups can be the same or different.

In one form of the invention R is $-(R_2Z)_mR_2-$ where $R_2$ is alkylene of at least two carbon atoms, Z is oxygen or sulfur and $m$ is an integer of at least 1.

The thiophosphites are useful as antioxidants, e.g., for polyethylene, polypropylene, EPDM rubber, vinyl chloride resins, foods, lubricating oils, natural rubber, butadiene-styrene, copolymer butadiene-acrylonitrile copolymer, acrylonitrile-butadiene-styrene (ABS), poly cis-isoprene, polyesters, etc. They are also defoliants, e.g., for cotton and are most effective for this use when the average number of carbon atoms in the R and $R_1$ groups is about 3 to 5.

The thiophosphate compounds are useful as defoliants and as plasticizers, e.g., for cellulose esters such as cellulose acetate or vinyl chloride polymers.

The thiophosphite products are conveniently prepared by reacting phosphorus trichloride with a compound $R_1SH$ and a compound HXRXH. When n is zero there is employed 1 mole of $PCl_3$, 4 moles of $R_1SH$ and 0.5 mole of HXRXH. A slight excess of $R_1SH$ can be used if desired.

When $n$ is 1 there is employed 3 moles of $PCl_3$, 5 moles of $R_1SH$ and 2 moles of HXRXH. Preferably a slight excess of $PCl_3$ is employed.

When $n$ is 2 to 9 the following mole ratios should be used:

| n | $PCl_3$ | $R_1SH$ | HXRXH |
|---|---|---|---|
| 2 | 4 | 6 | 3 |
| 3 | 5 | 7 | 4 |
| 4 | 6 | 8 | 5 |
| 5 | 7 | 9 | 6 |
| 6 | 8 | 10 | 7 |
| 7 | 9 | 11 | 8 |
| 8 | 10 | 12 | 9 |
| 9 | 11 | 13 | 10 |

To prepare the corresponding thiophosphates air or oxygen can be passed through the thiophosphite.

If a mixture of $R_1SH$ compound is used then the product will have mixed $R_1$ groups while if a single $R_1SH$ compound is used the product will have only one type of $R_1$ group.

As examples of $R_1SH$ compounds there can be used methyl mercaptan, ethyl mercaptan, propyl mercaptan, butyl mercaptan, sec. butyl mercaptan, t-butyl mercaptan, isobutyl mercaptan, amyl mercaptan, hexyl mercaptan, heptyl mercaptan, octyl mercaptan, isooctyl mercaptan, 2-ethylhexyl mercaptan, nonyl mercaptan, decyl mercaptan, isodecyl mercaptan, dodecyl mercaptan, t-dodecyl mercaptan, hexadecyl mercaptan (cetyl mercaptan), octadecyl mercaptan, eicosanyl mercaptan, chloroethyl mercaptan, 3-chloropropyl mercaptan, 2-chloropropyl mercaptan, 4-chlorobutyl mercaptan, 6-chlorohexyl mercaptan, 10-chlorodecyl mercaptan, 18-chlorooctadecyl mercaptan, 20-chloroeicosanyl mercaptan, allyl mercaptan (propenethiol), α-naphthyl mercaptan, β-napthyl mercaptan, crotyl mercaptan, pentene 4-thiol, oleyl mercaptan, 2-bromoethyl mercaptan, 4-bromobutyl mercaptan, thiophenol, 2-methyl benzenethiol, 3-methyl benzene thiol, 4-methyl benzene thio (p-thiocresol), 4-butyl-benzenethiol, 4-octylbenzenethiol, 2-dodecylbenzenethiol, 4-nonylbenzenethiol, 2,4,6-trimethylbenzenethiol, 2,6-dimethylbenzenethiol (thioxylenol), 2-chlorobenzene-thio, 4-chlorobenzenethiol, 3-bromobenzenethio, 2,4-dichlorobenzenethiol, 2-chloro-4-methylbenzenethiol, benzyl mercaptan, cyclohexyl mercaptan, cyclopentyl mercaptan, methanethiol, mercaptocyclohexane, mercapto-alpha-terpinene, mercapto phellandrene, mercapto sylvestrene, 2-mercaptopyridine, 5-mercaptopyridine, mercaptothiophene, 2-mercapto methylcyclohexane.

Examples of HXRXH compounds are 1,2-dimercapto ethane, 1,3-dimercapto propane, 1,2-dimercaptopropane, 1,4-dimercaptobutane, 1,5-dimercaptopentane, 1,6-dimercaptohexane, 1,8-dimercaptooctane, 2,3-dimercaptopentadecane, 1,15-dimercaptopentadecane, 1,6-dimercapto eicosane, 1,20-dimercaptoeicosane, 1,4-dimercapto-2-butene, 1,8-dimercapto-2-octene, dimercaptoethyl ether, dimercaptopropyl ether, dimercapto diethyl sulfide, dimercapto dipropyl sulfide, dimercapto tetraethylene glycol, dimercapto dipropylene glycol, dimercapto tripropylene glycol, bis(mercaptooctyl)ether, bis(mercaptooctyl)thioether, 2,9-p-menthane dithiol, dimercapto alpha-terpinene, dimercapto phellandrene, dimercapto sylvestrene, 2,5-dimercapto pyridine, dimercaptothiophene, dimercapto p-dioxane, dimercapto xylene, 1,3-dimercapto 2-methylbenzene, 1,4-dimercapto 2-methylbenzene, p-dimercaptobenzene, 1,4-dimercapto cyclohexane, 1,4-dimercapto-2-methyl cyclohexane, isopropylidene bis(4-mercaptobenzene), methylene bis(4-mercaptobenzene), ethylidene bis(4-mercaptobenzene), isopropylidene bis(4-mercaptocyclohexane), methylene bis(4-mercaptocyclohexane), ethylidene bis(4-mercaptocyclohexane), 1,4bis(mercaptomethyl) benzene, 1,3bis(mercaptomethyl) benzene, 1,4bis(mercaptomethyl) cyclohexane, 1,3 dimercapto cyclopentane, 1,8-dimercaptonaphthalene.

Examples of thiophosphite compounds within the present invention are tetrakis (mercaptoethyl) 1,2-dimercaptoethylene diphosphite, tetrakis(mercaptohexyl) 1,2-dimercaptoethylene diphosphite, tetrakis(mercaptolauryl) 1,2-dimercaptoethylene diphosphite, tetrakis(mercaptobutyl) 1,2-dimercaptopropylene diphosphite, tetrakis(mercaptoisopropyl) 1,3-dimercapto propylene diphosphite, tetrakis (mercaptomethyl) 1,6-dimercaptohexylene diphosphite di(mercaptoethyl) di(mercaptopropyl) 1,6-dimercaptohexylene diphosphite, tetrakis (mercapto t-butyl) 1,6-dimercaptohexylene diphosphite, tetrakis (mercapto sec. butyl) 1,6-dimercaptohexylene diphosphite, tetrakis (mercaptohexyl) 1,6-dimercaptohexylene diphosphite, tetrakis(mercapto 2-ethylhexyl) 1,6-dimercaptohexylene diphosphite, tetrakis (mercaptolauryl) 1,6-dimercaptohexylene diphosphite, tetrakis (mercaptodecyl) 1,6-dimercaptohexylene diphosphite, mercaptononyl mercaptodecyl mercaptolauryl mercaptotetradecyl 1,6-dimercaptohexylene diphosphite, tetrakis(mercaptohexadecyl)1,6-dimercaptohexylene diphosphite, tetrakis(mercaptoisodecyl) 1,6-dimercaptohexylene diphosphite, tetrakis(mercaptooctadecyl) 1,6-dimercaptohexylene diphosphite, tetrakis(mercaptoeicosanyl) 1,6-dimercaptohexylene diphosphite, tetrakis(mercaptobenzyl) 1,6-dimercaptohexylene diphosphite, tetrakis(mercaptocyclopentyl) 1,6-dimercaptohexylene diphosphite, tetrakis(mercaptocyclohexyl) 1,6-dimercaptohexylene diphosphite, tetrakis(2-mercapto methylcyclohexyl) 1,6-dimercaptohexylene diphosphite, tetrakis (2-mercapto methylcyclohexyl) 1,6-dimercaptohexylene diphosphite, tetrakis(2-chloro 1-mercaptoethyl) 1,6-dimercaptohexylene diphosphite, tetrakis(3-chloro-1-mercaptopropyl) 1,6-dimercaptohexylene diphosphite, tetrakis(mercapto alpha terpinyl) 1,6-dimercaptohexylene diphosphite, tetrakis(5-mercaptopyridyl) 1,6-dimercaptohexylene diphosphite, tetrakis(mercaptothienyl) 1,6-dimercaptohexylene diphosphite, tetrakis(4-bromo-1-mercaptobutyl) 1,6-dimercaptohexylene diphosphite, tetrakis (mercaptophenyl) 1,6-dimercaptohexylene diphosphite, di(mercaptodecyl) di(mercaptophenyl) 1,6-dimercaptohexylene diphosphite, tetrakis(2-chloroallylmercapto) 1,6-dimercaptohexylene diphosphite, tetrakis(4-methyl-1-mercaptophenyl) 1,6-dimercaptohexylene diphosphite tetrakis(2,6-dimethyl-1-mercaptophenyl) 1,6-dimercaptohexylene diphosphite, tetrakis(2,4,6-trimethyl-1-mercaptophenyl) 1,6-dimercaptohexylene diphosphite, tetrakis (4-butyl-1-mercaptophenyl)1,5-dimercaptohexylene diphosphite, tetrakis(2-octyl-1-mercaptophenyl) 1,6-dimercaptohexylene diphosphite, tetrakis(4-nonyl-1-mercaptophenyl) 1,6-dimercaptohexylene diphosphite, tetrakis(3-dodecyl-1-mercaptophenyl) 1,6-dimercaptohexylene diphosphite, tetrakis (2-bromo-1-mercaptophenyl) 1,6-dimercaptohexylene diphosphite, tetrakis (3-bromo-1-mercaptophenyl) 1,6-dimercaptohexylene diphosphite, tetrakis(mercaptolauryl) 1,4-dimercaptobutylene diphosphite, tetrakis(mercaptophenyl) 1,6-dimercaptoeicosanylene diphosphite, tetrakis(mercaptodecyl) 1,20-dimercaptoeicosanylene diphosphite, tetrakis(mercaptolauryl)β,β'-dimercapto ethyl ether diphosphite, tetrakis(4-nonyl-1-mercaptophenyl) 3,3'-dimercaptopropyl ether diphosphite, tetrakis(mercaptoisodecyl) 1,4-dithiobutene-2diphosphite, tetrakis(mercaptoallyl) 1,6-dimercaptohexylene diphosphite, tetrakis (mercaptooleyl) 1,6-dimercaptohexylene diphosphite, tetrakis(mercaptocetyl) 2,2'-dimercaptoethyl thioether diphosphite, tetrakis(mercaptoisodecyl) dimercaptodiethylene glycol diphosphite, tetrakis(mercaptophenyl) dimercapto dipropylene glycol diphosphite, tetrakis(4-nonyl-1-mercaptophenyl) dimercapto tetraethylene glycol diphosphite, tetrakis(mercaptolauryl) omega, omega' dimercaptoocyl ether diphosphite, tetrakis(mercaptolauryl) omega, omega' dimercaptooctyl thioether diphosphite, tetrakis(mercaptolauryl) 2,9-dimercapto-p-methylene diphosphite, tetrakis(mercaptophenyl) 2,9-dimercapto-p-menthylene diphosphite, tetrakis (alpha-ercaptonaphthyl) 2,9-dimercapto-p-menthylene diphosphite, tetrakis(mercaptolauryl) 2,5-dimercapto pyridine diphosphite, tetrakis(mercaptooctyl) 2,4-dimercapto thiophene diphosphite, tetrakis(mercaptolauryl) p-dimercaptophenylene diphosphite, tetrakis(o-octyl mercaptophenyl) p-dimercaptophenylene diphosphite, tetrakis(mercaptolauryl) 2-methyl-1,4-dimercaptophenylene diphosphite, tetrakis(mercaptocetyl) dimercapto cyclohexylene diphosphite, tetrakis(mercaptolauryl) isopropylidene bis(4-mercaptobenzene) diphosphite, tetrakis(mercaptophenyl) isopropylidene bis(4-mercaptobenzene) diphosphite, tetrakis (mercaptolauryl) 1,4-bis(mercaptomethyl)benzene diphosphite, tetrakis(mercaptolauryl) 1,4-bis(mercaptomethyl) cyclohexane diphosphite, tetrakis(mercaptolauryl) 1,3-dimercaptocyclopentylene diphosphite, tetrakis(mercaptolauryl) 1,8-dimercaptonaphthalene diphosphite, pentakis(dodecylmercapto) bis(1,6-hexylenedimercapto) triphosphite, pentakis(phenylmercapto) bis(1,6-hexylenedimercapto) triphosphite, tris(dodecylmercapto) bis(p-nonylphenylmercapto) bis(1,6-hexylenedimercapto) triphosphite, pentakis(octadecylmercapto) bis(1,2-ethylenedimercapto) triphosphite, pentakis (dodecylmercapto) bis(2,9-p-menthylenedimercapto) triphosphite, pentakis(isodecylmercapto) bis(β,β'-dimercaptoethyl ether) triphosphite, hexakis(dodecylmercapto) tris(1,6-hexylenedimercapto)tetraphosphite, heptakis(dodecylmercapto) tetrakis(1,6-hexylene dimercapto) pentaphosphite dodecakis(laurylmercapto) nonakis(1,6-hexylene dimercapto) decaphosphite, dodecakis (phenylmercapto) nonakis(1,2-ethylene dimercapto) decaphosphite, dodecakis(decylmercapto) nonakis(2,9-p-menthylene dimercapto) decaphosphite, tetrakis(mercaptobutyl) 1,4-dimercaptobutylene diphosphite, tetrakis(mercaptobutyl) 1,8-dimercaptooctylene diphosphite, tetrakis(mercaptolauryl) ethylene diphosphite, tetrakis(mercaptophenyl) butylene diphosphite, tetrakis(mercaptooctyl) diethylene glycol diphosphite, tetrakis(p-nonyl mercaptophenyl) dipropylene glycol diphosphite, tetrakis (p-octadecyl mercaptophenyl) 1,6-dimercaptohexylene diphosphite.

Examples of thiophosphate compounds within the present invention include all of the thiophosphates corresponding to the thiophosphites just mentioned, e.g., tetrakis(mercaptoethyl) 1,2-dimercaptoethylene diphosphate, tetrakis(mercaptobutyl) 1,4-dimercaptobutylene diphosphate, tetrakis(mercaptobutyl) 1,8-dimercaptooctylene diphosphate, tetrakis(mercaptolauryl) 1,2-dimercaptoethylene diphosphate, tetrakis(mercaptolauryl) 1,6-dimercaptohexylene diphosphate, tetrakis(mercaptolauryl) 2,9-dimercapto-p-menthylene diphosphate, tetrakis(mercaptolauryl) β,β'-dimercaptoethyl ether diphosphate, pentakis(dodecyl mercapto) bis(1,6-hexylene dimercapto)triphosphate.

Unless otherwise indicated all parts and percentages are by weight.

The compounds of the present invention are useful as antioxidants and stabilizers for halogen containing resins, preferably vinyl chloride resins.

As the halogen containing resins there can be used resins made from vinylidene compounds such as vinyl chloride, vinylidene chloride, vinyl chloroacetate, chlorostyrenes, vinyl bromide and chlorobutadienes.

Such vinylidene compounds may be polymerized alone or in admixtures with each other or with vinylidene compounds free from halogen. Among the halogen free materials which can be copolymerized with the halogen containing vinylidene compounds, e.g., vinyl chloride, are vinyl esters of carboxylic acids, e.g., vinyl acetate, vinyl propionate, vinyl butyrate and vinyl benzoate, esters of unsaturated acids, e.g., alkyl and alkenyl acrylates such as methyl acrylate, ethyl acrylate, propyl acrylate, butyl acrylate and allyl acrylate as well as the corresponding methacrylates, e.g., methyl methacrylate and butyl methacrylate, vinyl aromatic compounds, e.g., styrene, p-ethyl styrene, divinyl benzene, vinyl naphthalene, α-methyl styrene, p-methyl styrene, dienes such as butadiene and isoprene, unsaturated amides such as acrylamide, methacrylamide and acrylanilide and the esters of α,β-unsaturated carboxylic acids, e.g., the methyl, ethyl, propyl, butyl, amyl, hexyl, heptyl, octyl, allyl, methallyl and phenyl esters of maleic, crotonic, itaconic and fumaric acids and the like. Specific examples of such esters are diethyl maleate, dibutyl maleate and dibutyl fumarate.

The copolymers in which at least 50 percent of the copolymer is made from a halogen containing vinylidene compound such as vinyl chloride are preferably treated according to the invention.

The stabilizers of the present invention are also effective when intimately mixed with halogen containing resins in which part or all of the halogen is introduced into a preformed resin, e.g., chlorinated polyvinyl acetate, chlorinated polystyrene, chlorinated polyethylene, chlorinated polyvinyl chloride, chlorinated natural and synthetic rubbers and rubber hydrochloride.

Typical examples of copolymers include vinyl chloride-vinyl acetate (95:5 weight ratio), vinyl chloride-vinyl acetate (87:13 weight ratio), vinyl chloride-vinyl acetate-maleic anhydride (86:13:1 weight ratio), vinyl chloride-vinylidene chloride (95:5 weight ratio), vinyl chloride-diethyl fumarate (95:5 weight ratio), vinyl chloride-trichloroethylene (95:5 weight ratio).

The resin, e.g., polyvinyl chloride, can either be plasticized or unplasticized. As the plasticizer there can be employed conventional materials such as dioctyl phthalate, octyl decyl phthalate, tricresyl phosphate, 2-ethylhexyl diphenyl phosphate, dodecyl dicresyl phosphate, tributyl acetyl citrate, dioctyl sebacate, dibutyl sebacate, etc. The plasticizer is used in conventional amount, e.g., 10 to 100 parts for each 100 parts of the vinyl chloride containing resin.

The mercapto containing stabilizers of the present invention are used in an amount of 0.05 to 20 parts, preferably 0.1 to 10 parts per 100 parts of halogen containing resin.

There can also be incorporated 0.1 to 10 parts per 100 parts of the halogen containing resin of a metal salt stabilizer. Thus, there can be used barium, strontium, calcium, cadmium, zinc, lead, tin, magnesium, cobalt, nickel, titanium and aluminum salts of phenols, aromatic carboxylic acids, fatty acids and epoxy fatty acids.

Examples of suitable salts includes barium di(nonylphenolate), strontium di(nonylphenolate), strontium di(amylphenolate), barium di(octylphenolate), strontium di(octylphenolate), barium di(nonyl-o-cresolate), lead di(octylphenolate), cadmium-2-ethylhexoate, cadmium laurate, cadmium stearate, zinc caprylate, cadmium caproate, barium stearate, barium 2-ethylhexoate, barium laurate, barium ricinoleate, lead stearate, aluminum stearate, magnesium stearate, calcium octoate, calcium stearate, cadmium naphthenate, cadmium benzoate, cadmium p-tert, butylbenzoate, barium octyl salicylate, cadmium epoxy stearate, strontium epoxy stearate, cadmium salt of epoxidized acids of soybean oil, and lead epoxy stearate.

In plastisol formulations there is preferably also included from 0.1 to 10 parts per 100 parts of resin of an epoxy vegetable oil such as epoxidized soybean oil or epoxidized tall oil.

Also can be incorporated a phosphite, e.g., and alkyl, aryl or aralkyl phosphite in an amount of 0.1 to 10 parts per 100 parts of resin. Typical of such phosphites are triphenyl phosphite, tris decyl phosphite, decyl diphenyl phosphite, di(p-tert. butylphenyl) phenyl phosphite, di-phenyl o-cresyl phosphite, trioctyl phosphite, tricresyl phosphite and tribenzyl phosphite.

The compounds of the present invention are also stabilizers for monoolefin polymers such as polyethylene, polypropylene, ethylene propylene copolymers (e.g., 50:50, 80:20 and 20:80), ethylene-monoolefin copolymers wherein the monoolefin has four to 10 carbon atoms and is present in a minor amount, e.g., ethylene-butene-1 copolymer (95:5) and ethylene-decene-1 copolymer (90:10). Furthermore, they can be used to stabilize natural rubber, styrene-butadiene rubber (SBR rubber), e.g., (75% butadiene, 25% styrene) and EPDM rubbers and acrylonitrile butadiene styrene terpolymers (ABS).

As the EPDM rubber there can be employed many of the commercially available EPDM rubbers. The EPDM rubber normally contains 30 to 70 molar percent (preferably 50 to 60 molar percent) of ethylene, 65 to 20 molar percent (preferably 35 to 45 molar percent propylene) and 1 to 15 molar percent (preferably 3 to 5 molar percent) of the nonconjugated polyolefin. Usually the polyolefin is not cover 10 molar percent. The ethylene and propylene can each be 5 to 95 molar percent of the composition.

As used in the present specification and claims the term nonconjugated polyolefin includes aliphatic nonconjugated polyene hydrocarbons and cycloaliphatic nonconjugated polyene hydrocarbons, e.g., endocyclic dienes. Specific examples of suitable nonconjugated polyolefins include pentadiene-1,4; hexadiene-1,4; dicyclopentadiene, methyl cyclopentadiene dimer, cyclododecatriene, cyclooctadiene-1,5; 5-methylene-2-norbornene.

Specific examples of suitable terpolymers are the Royalenes which contain 55 mole percent ethylene, 40 to 42 mole percent propylene and 3 to 5 mole percent dicyclopentadiene; Enjay terpolymers, e.g., ERP–404 of Enjay and Enjay 3509 which contains about 55 mole percent ethylene, 41 mole percent propylene and 4 mole percent 5-methylene-2-norbornene; Nordel, a terpolymer of 55 mole percent ethylene, 40 mole percent propylene and 5 mole percent hexadiene-1,4. Another suitable terpolymer is the one containing 50 mole percent ethylene, 47 mole percent propylene and 3 mole percent 1,5-cyclooctadiene (Dutrel).

Examples of EPDM rubbers are given in U.S. Pat. Nos. 2,933,480; 3,000,866; 3,063,973; 3,093,620; 3,093,621, and 3,136,739, in British Pat. No. 880,904 and in Belgian Pat. No. 623,698.

Terpolymers and other EPDM rubbers from ethylene, propylene and dicyclopentadiene are exemplified in Tarney U.S. Pat. No. 3,000,866; Adamek U.S. Pat. No. 3,136,739 and Dunlop (British) Pat. No. 880,904. EPDM rubbers from ethylene, propylene and 1,4-hexadiene are exemplified in Gresham U.S. Pat. No. 2,933,480. As shown in Gresham other suitable non-conjugated diolefins are 1,4-pentadiene; 2-methyl-1,5 hexadiene, 3,3-dimethyl-1, 5-hexadiene, 1,7-octadiene, 1,9-decadiene, 1,19eicosadiene, 1,4-hexadiene, 1,9-octadecadiene, 6-methyl-1,5-heptadiene, 7-methyl-1,6-octadiene, 11-ethyl-1,11-tridecadiene.

EPDM rubbers from ethylene, propylene and 5-methyl-ene-2-norbornene are exemplified in U.S. Pat. No. 3,093,621. Suitable norbornadiene, e.g., 2-methyl norbornadiene, 2-ethyl norbornadiene, 2-n-heptyl norbornadiene are shown in Gladding U.S. Pat. No. 3,063,973 and bicyclo compounds such as bicyclo (2,2,2) heptadiene-2,5 are shown in Dunlop (British) Pat. No. 880,904. The use of cyclooctadiene-1,5 and other cyclodienes is shown in Montecatini (Belgium) Pat. No. 623,698. Thus these can be used in making the EPDM elastomer 1,4-cycloheptadiene, 1,4-cyclooctadiene, 1,6-cyclodecadiene, 1,5-cyclododecadiene, 1,7-cyclodecadiene, 1,5,9cyclododecatriene, 1-methyl-1,5-cyclooctadiene.

The compounds of the present invention are normally employed in an amount of at least 0.01 percent and usually 0.1 percent to 10 percent by weight of the polymer they are intended to stabilize.

They can also be used as synergistic stabilizers with other sulfur containing compounds. Thus, there can be employed therewith neutral sulfur compounds having a thio linkage beta to a carbon atom having both a hydrogen atom and a carboxyl group attached thereto. Such compounds are used in an amount of 0.01 to 10 percent, preferably 0.1–5 percent. Thus there can be used pentaerythritol tetra (mercaptoacetate), 1,1,1-trimethylolethane tri (mercaptoacetate), 1,1,1-trimethylolpropane tri (mercaptoacetate), dioleyl thiodipropionate, dilauryl thiodipropionate, other thio compounds include distearyl 3,3'-thiodipropionate, dicyclohexyl-3,3'-thiodipropionate, dicetyl-3,3'-thiodipropionate, dioctyl-3,3'-thiodipropionate, dibenzyl-3,3'-thiodipropionate, lauryl myristyl-3,3'-thiodipropionate, diphenyl-3,3'-thiodipropionate, di-p-methoxy-phenyl-3,3'-thiodipropionate, didecyl-3,3'-thiodipropionate, dibenzyl-3,3'-thiodipropionate, diethyl-3,3'-thiodipropionate, lauryl ester of 3-methyl-mercapto propionic acid, lauryl ester of 3-butyl-mercapto propionic acid, lauryl ester of 3-lauryl-mercapto propionic acid, phenyl ester of 3-octylmercapto propionic acid, lauryl ester of 3-phenylmercapto propionic acid, lauryl ester of 3-benzylmercapto propionic acid, lauryl ester of 3-(p-methoxy) phenylmercapto propionic acid, lauryl ester of 3-cyclohexylmercapto propionic acid, lauryl ester of 3-hydroxymethylmercaptopropionic acid, myristyl ester of 3-hydroxyethyl-mercapto propionic acid, octyl ester of 3-methoxymethylmercapto propionic acid, dilauryl ester of 3-carboxylmethylmercapto propionic acid, dilauryl ester of 3-carboxypropylmercapto propionic acid, dilauryl-4,7-dithiasebacate, dilauryl-4,7,8,11-tetrathiotetradecandioate, dimyristyl-4,11-dithiatetradecandioate, lauryl-3-benzothiazylmercaptopropionate. Preferably the esterifying alcohol is an alkanol having 10 to 18 carbon atoms. Other esters of beta thiocarboxylic acids set forth in Gribbins U.S. Pat. No. 2,519,744 can also be used.

Other beta thiocarboxylic acids include stearyl (1,2-dicarboethoxyethylthio) acetate, stearyl (1,2-dicarbolauryloxyethylthio)acetate or the like. Compounds of this type can be made by addition of alkyl ester of mercaptoacetic acid to a dialkyl ester of maleic acid. Similar beta thiocarboxyl compounds can be used which are made by addition of an RSH compound across the maleic ester double bond and where R is alkyl, aryl, alkylcarboxyalkyl, arylcarboxyalkyl or aralkyl. Examples of such compounds are decylthiodilauryl maleate, phenylthiodioctyl maleate, cetyl (1,2-dicarboethoxyethylthio) propionate and benzylthiodimyristyl maleate.

Similar useful beta thiocarboxyl synergistic compounds can be prepared by addition of the RSH compounds as defined above across the double bond of dialkyl itaconates, citraconates, fumarates or trialkyl aconitates, e.g., the addition product of lauryl mercaptan with dibutyl itaconate, the addition product of the stearyl ester of mercaptoacetic acid with dilauryl itaconate, the addition product of butyl mercaptan with dilauryl citraconate, the addition product of lauryl mercaptan with tributyl aconitate, the additional product of the lauryl ester of mercaptopropionic acid with triethyl aconitate.

The thermal stability of the polypropylene and other monoolefin polymer is adversely affected by impurities including residual catalyst. When thermal stability is important in addition to oxidative stability it has been found valuable to include polyvalent metal salts of fatty acids in an amount of 0.01–10 percent, preferably 0.1–5 percent, in the monoolefin polymer formulations. Examples of such salts are calcium stearate, calcium 2-ethylhexoate, calcium octate, calcium oleate, calcium ricinoleate, calcium myristate, calcium palmitate, calcium laurate, barium laurate, barium stearate, magnesium stearate as well as zinc stearate, cadmium laurate, cadmium octoate, cadmium stearate and the other polyvalent metal salts of fatty acids set forth previously.

There can also be added phenolic antioxidants in an amount of 0.01–10 percent, preferably 0.1–5 percent. Examples of such phenols include 2,6-di-$t$-butyl-$p$-cresol, butylated hydroxyanisole, propyl gallate, 4,4'-thiobis(6-$t$-tubyl-$m$-cresol), 4,4'-cyclohexylidene diphenol, 2,5-di-$t$-amyl hydroquinone, 4,4'-butylidene bis(6-$t$-butyl-$m$-cresol), hydroquinone monobenzyl ether, 2,2'-methylene-bis(4-methyl-6-$t$-butylphenol), 2,6-butyl-4-decyloxy-phenol, 2-$t$-butyl-4-dodecyloxyphenol, 2-$t$-butyl-4-dodecyloxy-phenol, 2-$t$-butyl-4-octadecyloxyphenol, 4,4'-methylene-bis(2,6-di-$t$-butyl phenol), p-aminophenol, N-lauryloxy-p-aminophenol, 4,4'-thiobis(3-methyl-6-$t$-butylphenol), bis[o-(1,1,3,3-tetramethylbutyl)phenol] sulfide, 4-acetyl-$\beta$-resorcylic acid, A stage p-$t$-butylphenolformaldehyde resin, 4-dodecycloxy-2-hydroxybenzophenone, 3-hydroxy-4-(phenylcarbonyl)phenyl palmitate, n-dodecyl ester of 3-hydroxy-4-(phenylcarbonyl) phenoxyacetic acid, and t-butylphenol.

The use of epoxy compounds in an amount of 0.01–5 percent in the polymer compositions is also valuable. Examples of such epoxy compounds include epoxidized soya bean oil, epoxidized lard oil, epoxidized olive oil, epoxidized linseed oil, epoxidized caster oil, epoxidized peanut oil, epoxidized corn oil, epoxidized tung oil, epoxidized cottonseed oil, epichlorhydrinbisphenol A resins (epichlorhydrin-diphenylolpropane resins), phenoxy-propylene oxide, butoxy-propylene oxide, epoxidized neopentylene oleate, glycidyl epoxystearate, epoxidized $\alpha$-olefins, epoxidized glycidyl soyate, dicyclopentadiene dioxide, epoxidized butyl tollate, styrene oxide, dipentene dioxide, glycidol, vinyl cyclohexene dioxide, glycidyl ether of resorcinol, gylcidol ether of hydroquinone, glycidyl ether of 1,5-dihydroxynaphthalene, epoxidized linseed oil fatty acids, allyl glycidyl ether, butyl glycidyl ether, cyclohexane oxide, 4-(2,3-epoxypropoxy) acetophenone, mesityl oxide epoxide, 2-ethyl-3-propyl glycidamide, glycidyl ethers of glycerine, pentaerythritol and sorbitol, and 3,4-epoxycyclohexane-1,1-dimethanol bis-9,10-epoxystearate. They also can be employed together with conventional phosphites or thiophosphites, e.g., tristearyl phosphite, or any of the thiophosphites mentioned in Friedman U.S. Pat. No. 3,039,993 or Larrison U.S. Pat. No. 3,341,629 or Friedman U.S. Pat. No. 3,053,818. The conventional phosphites can be used in an amount of 0.1 to 10 percent of the weight of the polymer being stabilized.

EXAMPLE 1
TETRAKIS (MERCAPTO-LAURYL) 1,2-DIMERCAPTO-ETHYLENE DIPHOSPHITE

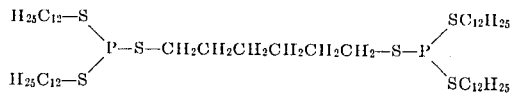

The compound was prepared as follows:

47 parts 1,2-Ethanedithiol and 424 parts $n$-Dodecylmercaptan were charged to a glass reactor. 137 parts pure phosphorus trichloride was added to the well agitated mixture during a 35-minute interval. The temperature ranged from 58° to 70° C. during the addition. Gaseous HCl was evolved rapidly during the addition of the PCl$_3$. The stirred reaction mass was heated to 143° C. in 2 hours following the addition of the PCl$_3$ at which time evolution of HCl had substantially closed. The pressure on the reaction mass was then reduced to 25 Torr, and slow heating continued for an additional 40 minutes. The pressure was then reduced to 5 Torr, and heating continued for an additional hr. and 25 minutes at which time the temperature was 205° C. The reaction product was cooled to 170° C. and the vacuum was broken by a non-oxidizing gas (nitrogen). The liquid product (residue was then treated with 10 g. sodium carbonate, 5 g. Hy-flo (filter aid) and 2 g. Attagel (deodorizing clay) and then filtered thru Whatman No. 3 filter paper at 100° C. The filtrate (refined reaction product) had the following properties:

| | |
|---|---|
| Refractive Index $n_D^{25}$ | 1.5130 |
| Specific Gravity 25°C/25°C | 0.942 |
| Acid No., mg. KOH per gram | 0.9 |
| Color, APHA | 0 |
| Phosphorus | 6.4% |

It was substantially free of mercaptan odor.

EXAMPLE 2
TETRAKIS (MERCAPTO-LAURYL) 1,6 DIMERCAPTO-HEXYLENE DIPHOSPHITE

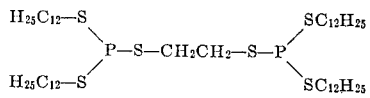

To a mixture consisting of:
37.5 g. 1,6-Hexanedithiol (0.25 mol.) and 212 g. n-Dodecylmercaptan (1.04 mol.) was added
68 g. phosphorus trichloride during a 25-minute period. The temperature during the addition was 25° to 50° C. HCl was evolved rapidly during the addition. After the PCl$_3$ had been added, the temperature of the reaction mass was raised to 145° C. during a 2½ hour interval. HCl evolution had substantially ceased at the termination of this heating period. The pressure was then reduced to 25 Torr while heating and stirring for an additional 2 hour interval. Then the pressure was reduced to 2 Torr and the temperature increased to 190° C. Vacuum was released by a non-oxidizing gas (nitrogen). The liquid product (flask residue) was stirred with 5 g. dry soda ash and 10 g. Hy-flo and filtered at 130°C.

The properties of the filtrate were:

| | |
|---|---|
| R.I. $n_D^{25}$ | 1.5217 |
| Specific Gravity 25°C/25°C | 0.955 |
| Acid No., mg. KOH per gram | 0.05 |
| Color, APHA | 0 |
| Phosphorus | 6.2% |
| Sulfur | 18.7% |

EXAMPLE 3
TETRAKIS (MERCAPTO-LAURYL) 2,9-DIMERCAPTO-PARA-MENTHYLENE DIPHOSPHITE

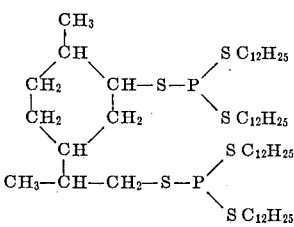

To a mixture consisting of:
425 g. n-Dodecylmercaptan (2.1 mol.) and 102 g. 2,9-para-Menthanedithiol (0.5 mol.)
at 72 - 75°C was added, during a 20 minute period, 137 G. PCl$_3$ (1.0 mol.). HCl was evolved rapidly. The reaction mixture was then heated to 135° C. during 1½ hours. The pressure was reduced to 30 Torr and the temperature maintained at 135°–145° C. for 1½ hours. The pressure was further reduced to 3 Torr and the temperature raised to 205 over a 2-hour period. The reaction product was cooled to 180° C. and vacuum broken by a non-oxidizing gas (nitrogen). The 5 g. dry soda ash, 10 g. Hy-flo and 2 g. Attagel were added and mixture stirred for 40 minutes at 120°–130° C.; then filtered using Whatman No. 3 paper.

The filtrate (final product) had the following properties:

| | |
|---|---|
| R.I. $n_D^{25}$ | 1.5285 |
| Specific Gravity 25°C/25°C | 0.9680 |
| Acid No., mg. KOH per gram | 0.08 |
| Color, APHA | 0 |
| Phosphorus | 5.9% |
| Sulfur | 17.7% |

Mercaptan odor was slight.

EXAMPLE 4

TETRAKIS (MERCAPTO-LAURYL) B,B'-DIMERCAPTO-ETHYL ETHER DIPHOSPHITE $$\begin{array}{c} H_{25}C_{12}-S \\ \phantom{H_{25}C_{12}-}\diagdown \\ \phantom{H_{25}C_{12}-S}P-S-C_2H_4-O\,C_2H_4-S-P \\ \phantom{H_{25}C_{12}-}\diagup \\ H_{25}C_{12}-S \end{array} \begin{array}{c} S-C_{12}H_{25} \\ \diagup \\ \phantom{P} \\ \diagdown \\ S-C_{12}H_{25} \end{array}$$

Charge to 1,000 ml. flask: 422 g. n-Dodecylmercaptan (2.00 mol.) and 69 g. B,B'-Dimercapto-Ethyl Ether (0.5 mol.) This mixture was heated to 70° C. and 137 g. PCl$_3$ added from a pressure equalizing dropping funnel, during a 20-minute interval. The reaction mixture was then heated to 130° C. during the succeeding 1½ hours, at which time the pressure was reduced to 25 Torr and slow heating continued for 1 hour. The pressure was then reduced to 5 Torr and heating continued for an hour. The product was heated to 190° C. at 2 Torr. The liquid product (flask residue) was treated with 10 g. dry soda ash, 5 g. Hy-flo and 2 g. Attagel and filtered at 100°–110° C.

The properties of the filtrate were:

| | |
|---|---|
| R.I. $n_D^{25}$ | 1.5108 |
| Specific Gravity 25°C/25°C | 0.979 |
| Acid No., mg. KOH per gram | 2.4 |
| Color, APHA | 70 |
| Phosphorus | 6.2% |
| Sulfur | 19.0% |

EXAMPLE 5

PENTAKIS (DODECYL MERCAPTO) BIS(1,6-HEXYLENE-DIMERCAPTO)TRIPHOSPHITE $$\begin{array}{c} H_{25}C_{12}-S \\ \diagdown \\ P-S-C_6H_{12}-S-P-S-C_6H_{12}-S-P \\ \diagup \quad\quad\quad\quad | \\ H_{25}C_{12}-S \quad\quad\quad S \\ \phantom{H_{25}C_{12}-S}C_{12}H_{25} \end{array} \begin{array}{c} S-C_{12}H_{25} \\ \diagup \\ \\ \diagdown \\ S-C_{12}H_{25} \end{array}$$

505 g. n-Dodecyl Mercaptan (2.5 Moles)
150 g. 1,6-Hexane Di-Thiol (1.0 Moles)
215 g. PCl$_3$ (1.5 Moles + 5% x's)

There were charged the n-Dodecyl Mercaptan and 1,6-hexane DiThiol to a 1-liter flask. PCl$_3$ was added with dropping funnel over a 1-hour period between 40°–50° C. A trap system was set up to absorb the HCl formed. After addition of PCl$_3$ was complete, the mixture was heated during a 3-hour period to 180° C., cooled to 100° C. and evacuated with a water aspirator. Heat under this vacuum was applied to 160° C. and then a switch was made to a Welsh pump with termination at 205° C. at 2–3 mm. The product was cooled to 170° C., the vacuum broken with nitrogen, Hy-Flo added and filtration carried out at 100° C. to obtain the product as a liquid.

Product Properties:

| | | | |
|---|---|---|---|
| R.I. at 25 C | 1.5256 | % P | 6.6 |
| Sp. Gr. at 25 C | 0.969 | % S | 21.0 |
| Color, APHA | 10 | % Cl(Trace) | |
| Acid No., mg. KOH | 0.35 | % Cl(trace) | |

EXAMPLE 6

One part of the product of EXAMPLE 2 was mixed with 100 parts of rigid polyvinyl chloride.

EXAMPLE 7

One part of the product of EXAMPLE 1 was mixed with 100 parts of vinyl chloride resin also containing 60 parts of dioctyl phthalate and 1 part of barium-cadmium laurate.

EXAMPLE 8

One part of the product of EXAMPLE 3 was mixed with 100 parts of polypropylene to stabilize the polymer.

EXAMPLE 9

One part of the product of EXAMPLE 4 was mixed with 100 parts of natural rubber to stabilize the rubber.

EXAMPLE 10

One part of the product of EXAMPLE 5 was mixed with 100 parts of EPDM rubber (55 mole percent ethylene 41 mole percent propylene, 4 mole percent dicyclopentadiene) to stabilize the rubber.

EXAMPLE 11

100 parts of polypropylene (melt index 0.4) was mixed with a stabilizer consisting of 0.2 parts of the product of example 2, 0.2 parts dilaurylthiodipropionate and 0.2 parts of calcium stearate to give a polypropylene of improved heat stability, e.g., at 133° C.

EXAMPLE 12

100 parts of polypropylene (melt index 0.4) was mixed with a stabilizer consisting of 0.25 parts of the product of example 3 and 0.25 parts of dilauryl thiodipropionate to give a polypropylene of improved stability.

EXAMPLE 13

100 parts of polypropylene (melt index 0.4) was mixed with a stabilizer consisting of 0.2 parts of the product of example 4, 0.2 parts dilaurylthiodipropionate and 0.2 parts of 2,2'-methylene bis(4-methyl-6-t-butylphenol).

EXAMPLE 14

The product of example 2 was oxidized with air until two GM atomic weights of oxygen were absorbed per mole of phosphite compound. The liquid product obtained was tetrakis (mercaptolauryl) 1,6-dimercapto hexylene diphosphate of the formula $$\begin{array}{c} C_{12}H_{25}S \quad O \\ \diagdown \parallel \\ P-S-CH_2CH_2CH_2CH_2CH_2CH_2-S-P \\ \diagup \\ C_{12}H_{25}S \end{array} \begin{array}{c} O \quad SC_{12}H_{25} \\ \parallel \diagup \\ \\ \diagdown \\ S\,C_{12}H_{25} \end{array}$$

What is claimed is:

1. A compound having the formula $$\begin{array}{c} R_1S \quad Y \\ \diagdown \parallel \\ P-S(RS-P-S)_n-R-S-P \\ \diagup \quad\quad\quad\quad | \\ R_1S \quad\quad\quad S \\ \phantom{R_1S}R_1 \end{array} \begin{array}{c} Y \quad SR_1 \\ \parallel \diagup \\ \\ \diagdown \\ SR_1 \end{array}$$

where n is 0 or an integer not over 9, R is alkylene of two to 20 carbon atoms, cycloalkylene of five to six carbon atoms in the ring, arylene of six to 10 carbon atoms in the ring, —(R$_2$Z)mR$_{2bh}'$ where R$_2$ is alkylene of two to eight carbon atoms, Z is oxygen or sulfur, m is an integer of 1 to 3, divalent alkene having four to eight carbon atoms, menthylene, alpha-terpinylene, phellandrylene or sylvestrylene, R$_1$ is alkyl of one to 20 carbon atoms, haloalkyl of two to 20 carbon atoms, phenyl, alkylphenyl having up to 18 carbon atoms in the alkyl group, naphthyl, terpinyl, phellandryl, sylvestryl, halophenyl, chloromethyl phenyl, alkenyl of up to 20 carbon atoms, benzyl, cycloalkyl having five to six carbon atoms in the ring and Y is nothing or oxygen.

2. A compound according to claim 1 wherein Y is nothing.

3. A compound according to claim 2 wherein R$_1$ is alkyl of one to 20 carbon atoms, phenyl, alkylphenyl having up to 18 carbon atoms in the alkyl group, halophenyl where the halogen has an atomic weight of 35 to 80, alkenyl of three to 20 carbon atoms, benzyl or cycloalkyl having five to six carbon atoms in the ring.

4. A compound according to claim 3 wherein R is alkylene of two to 20 carbon atoms, cycloalkylene of five to six carbon atoms, arylene of six to 10 carbon atoms or menthylene.

5. A compound according to claim 4 where $n$ is 0.

6. A compound according to claim 5 wherein R is alkylene of up to 20 carbon atoms.

7. A compound according to claim 5, wherein R is cycloalkylene of five to six carbon atoms.

8. A compound according to claim 4 where $n$ is 1.

9. A compound according to claim 3 wherein R is $$-(R_2Z)_m R_2-$$

where $R_2$ is alkylene of two to eight carbon atoms, Z is oxygen or sulfur and $m$ an integer of one to three.

10. A compound according to claim 1 which is tetrakis-(mercaptolauryl)-1,2-dimercaptoethylene diphosphate 11. A compound according to claim 1 which is tetrakis-(mercaptolauryl)-1,6-dimercaptohexylene diphosphite 12. A compound according to claim 1 which is tetrakis-(mercaptolauryl)-2,9-dimercapto-para-menthylene diphosphite.

13. A compound according to claim 1 which is pentakis (dodecylmercapto)-bis-(1,6-hexylene-dimercapto) triphosphite.

14. A compound according to claim 3 were R is alkylene of two to 20 carbon atoms, cycloalkylene of five to six carbons in the ring or arylene of six to 10 carbon atoms in the ring.

15. A compound according to claim 1 wherein $R_1$ is alkyl of one to 20 carbon atoms, haloalkyl of two to 20 carbon atoms, phenyl, alkylphenyl having up to 18 carbon atoms in the alkyl group, naphthyl, terpinyl, phellandryl, sylvestryl, halophenyl, chloro methyl phenyl, alkenyl of three to 20 carbon atoms, benzyl, cycloalkyl having five to six carbon atoms in the ring and R is alkylene of two to 20 carbon atoms, cycloalkylene of five to six carbon atoms in the ring methylene, alpha-terpinylene, phellandrylene, sylvestrylene, arylene of six to 10 carbon atoms in the ring, alkylenoxyalkylene having two to eight carbon atoms in each alkylene group, alkylenthioalkylene having two to eight carbon atoms in each alkylene group, polyalkylene glycol having two to three carbon atoms in each alkylene group and having one to three ether oxygen atoms or divalent alkene having four to eight carbon atoms 16. A compound according to claim 15 wherein R is alkylene of two to 20 carbon atoms, cycloalkylene of five to six carbon atoms in the ring, menthylene or arylene of six to 10 carbon atoms in the ring.

17. A compound according to claim 16 wherein R is menthylene.

* * * * *